United States Patent [19]

Gray et al.

[11] Patent Number: 5,252,980
[45] Date of Patent: Oct. 12, 1993

[54] TARGET LOCATION SYSTEM

[75] Inventors: Clifford M. Gray, Owego, N.Y.; James L. Johnson, Frederick, Md.

[73] Assignee: The United States of America as represented by the Secretary of the Air Force, Washington, D.C.

[21] Appl. No.: 918,184

[22] Filed: Jul. 23, 1992

[51] Int. Cl.⁵ .................................. G01S 3/02
[52] U.S. Cl. .................................. 342/59; 342/453; 342/463; 342/107; 342/113
[58] Field of Search .............. 342/59, 107, 109, 113, 342/146, 450, 453, 463

[56] References Cited

U.S. PATENT DOCUMENTS

| | | | |
|---|---|---|---|
| 3,812,493 | 5/1974 | Afendykiw et al. | 342/145 |
| 3,939,475 | 2/1976 | Lewis | 342/129 |
| 3,991,418 | 11/1976 | Bennett | 342/418 |
| 3,996,590 | 12/1976 | Hammack | 342/465 |
| 4,241,347 | 12/1980 | Albanese et al. | 342/89 |
| 4,438,439 | 3/1984 | Shreve | 342/449 |
| 4,499,468 | 2/1985 | Montana et al. | 342/126 |
| 4,994,809 | 2/1991 | Yung et al. | 342/108 |
| 5,097,269 | 3/1992 | Takayama et al. | 342/453 |

*Primary Examiner*—John B. Sotomayor
*Attorney, Agent, or Firm*—William G. Auton; Donald J. Singer

[57] ABSTRACT

A tristatic radar tracking system is disclosed in which two remote transmitters and a radar receiver use a method for combining measurements of the Doppler frequency shift and angle of arrival of two signals scattered by a moving target to derive parameters of the target's trajectory through space.

9 Claims, 2 Drawing Sheets

TARGET LOCATION SYSTEM

STATEMENT OF GOVERNMENT INTEREST

The invention described herein may be manufactured and used by or for the Government for governmental purposes without the payment of any royalty thereon.

BACKGROUND OF THE INVENTION

The present invention relates generally to radar surveillance systems, and more specifically to a tristatic target location system which uses tristatic Doppler frequency shift and angle of arrival to locate radar targets and determine their trajectory.

Many target location techniques have been applied which use measurable characteristics of signals scattered by an object to locate the object in space. Conventional radars and active sonar systems, for example, use the measured time delay and angle of arrival of a single scattered signal to determine the range and bearing from the surveillance device to the target. Bistatic radars, in which the source of the signal and the receiver are some distance apart, also locate targets from the time delay and angle of arrival of the scattered signal, although the interpretation of measurements is somewhat more complicated. These approaches to target location depend on measurements of time delay. This dependence on time delay data imposes constraints on the types of signals which can be used, and on the design of the receiving equipment.

An accurate and unambiguous measurement of time delay requires: a broad band signal waveform; a signal that exhibits an unambiguous autocorrelation function over the time delays of interest; and time synchronization between the transmitter and receiver These requirements are difficult to achieve, particularly if the signal to be used is not under the control of the surveillance system designer Accurate measurements of Doppler frequency (time rate of change of signal delay), on the other hand, can often be obtained on signal waveforms which do not support useful time delay measurements. The Doppler shift of a scattered signal containing strong narrow band components, in particular, can be readily derived through straight forward spectral analysis. For this reason, an approach to target location which does not require time delay measurements offers some advantages.

A monostatic radar tracking system has its radar transmitter and its radar receiver located in the same physical location. A bistatic radar system has a single radar transmitter which is remotely located from a single radar receiver A tristatic radar tracking system has two radar transmitters which are remotely located from a passive radar receiver. The task of designing a tristatic radar tracking system is alleviated to some extent, by the systems disclosed in the following U.S. Patents, the disclosures of which are incorporated herein by reference:

U.S. Pat. No. 3,812,493 issued to Afendykiw et al;
U.S. Pat. No. 3,939,475 issued to Lewis;
U.S. Pat. No. 3,991,418 issued to Bennett;
U.S. Pat. No. 3,996,590 issued to Hammack; and
U.S. Pat. No. 4,499,468 issued to Montana et al.

Lewis discloses a method of measuring range with a large bistatic angle radar. The system of this patent includes a target, a first transmitting station, a second transmitting station, and a receiving station. Distance to the target is determined by known transmitter and receiver distances in combination with the measured time duration.

In Bennett the direction of skywave transmissions is determined by the application of monopulse direction finding techniques by the isolation of energy in Doppler shift modes involving high resolution spectrum analyses.

Montana et al determine range using a multistage radar system with a plurality of radar stations located in a square grid pattern. In the system of this patent a computer applies a range difference similarity test, a uniqueness test, and a position test to determine real targets from the plurality of echo returns received Hammack detects and tracks moving objects using a plurality of stations. Afendykiw et al are concerned with a target position system using cross correlation techniques. A target is located in the system of this patent by combining range and angular information.

While the above-cited references are instructive, a need remains to provide a Doppler shift tristatic arrangement in which the tristatic Doppler frequency shift and angle of arrival is used to instantaneously derive the parameters of the target's trajectory through space. The present invention is intended to satisfy that need.

SUMMARY OF THE INVENTION

The present invention includes a target tracking system in which a target's trajectory is determined using the Doppler frequency shift and angle of arrival of target echo return signals originating from two sources, and scattered by the moving target.

One embodiment of the invention includes a use of a tristatic radar system, with two remotely located transmitters and a passive receiver system The transmitters respectively emit a first and second radar signal, which are reflected from the target as a first and second target echo return signal. The passive receiver detects the angle-of-arrival of the target echo return signals to determine the azimuth and elevation of the target. The passive receiver also receives the first and second radar signals directly from the transmitters, which yields the information described below when used respectively as first and second reference signals.

By comparing the time of reception of the two reference signals with the two target echo return signals, it is possible to determine the range of the target from the passive receiver. By comparing the frequency of the two reference signals with the frequency of the target echo return signals, the Doppler shift in frequency is ascertained. This Doppler shift provides an indication of the target's velocity with respect to the two transmitters in a three dimensional coordinate system.

The actual velocity of the target may be obtaining measurements of the target's position over an interval of time, the target's velocity may be plotted to provide a first estimate of the target's velocity. Second, this first estimate of the target's velocity may be compared to the indication of velocity derived from the Doppler shift to refine the estimate of the target's trajectory.

It is an object of the present invention to provide a tristatic target tracking process which uses Doppler shift information to provide an indication of target velocity.

It is another affect of the present invention to provide design principles for a multistatic radar tracking system which uses multiple remotely located transmitters and a passive radar receiver to determine a target's position and trajectory.

These together with other objects, features and advantages of the invention will become more readily apparent from the following detailed description when taken in conjunction with the accompanying drawings wherein like elements are given like reference numerals throughout.

DETAILED DESCRIPTION OF THE PREFERRED EMBODIMENT

The present invention includes a target location system which combines measurements of the Doppler frequency shift and angle of arrival of two signals scattered by a moving target to derive the parameters of the targets' trajectory through space. Two signals originate from two spatially separate sources, are scattered by the target, and are then detected by a single receiver capable of measuring Doppler frequency shift and angle of arrival. The use of two sources and a receiver constitutes a tristatic system configuration. The algorithm for deriving target trajectory parameter estimates is a nonlinear minimum variance estimator. Unique features include the particular measurement set employed and the technique for selecting the initial parameter set.

Figure 1:
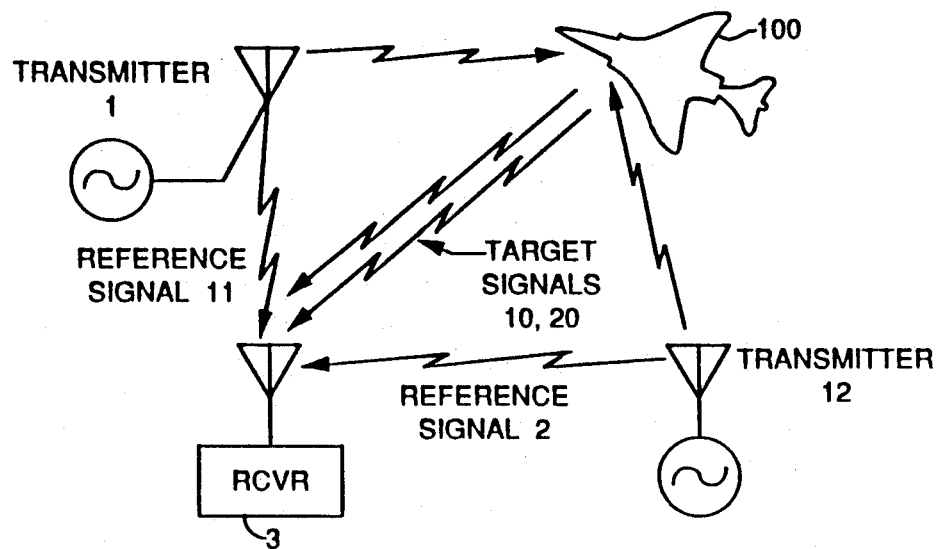
FIG. 1 is an illustration of a tristatic radar tracking system which is used with the present invention.

The reader's attention is now directed towards FIG. 1 which is an illustration of the tristatic radar system which is used with the present invention. As mentioned above, the tristatic radar system makes use of two transmitters 1 and 2, which are remotely located from each other, and the passive radar receiver 3.

The passive radar receiver 3 does not emit signals, it receives four radar signals: reference signals 11 and 12 directly from transmitters 1 and 2, and target echo return signals 10 and 20 directly from the radar target 100.

Using a conventional target tracking scheme, the system of FIG. 1 can compute the position and velocity of the target 100 as follows. The target's azimuth and elevation from the receiver is determined by the angle of arrival of the target echo return signals 10 and 20. If the antenna attached to the receiver 3 is a phased array antenna, the angle of arrival of these signals will manifest itself as a shift in phase across the elements of the array, as discussed in the Radar Handbook, by M. Skolnik, the disclosure of which is incorporated herein by reference.

Since the two transmitters 1 and 2 are located at fixed distances from the receiver 3, the reference signals 11 and 12 convey to the receiver both the original frequencies of the transmitted signal, and the exact time of their transmittal The receipt time of the target echo return signals 10 and 20 may be compared to the exact time of transmittal to yield an estimate of range of the target 100 from the receiver 3.

The object of the present invention is to provide an algorithm for deriving the position and velocity of a target by combining measurements of the Doppler shift and angle of arrival of two signals that originate from two spatially separate sources, are scattered by the target, and are then detected by a single receiver capable of measuring Doppler frequency shift and angle of arrival The use of two sources and a receiver constitutes a tristatic system configuration.

Figure 2:
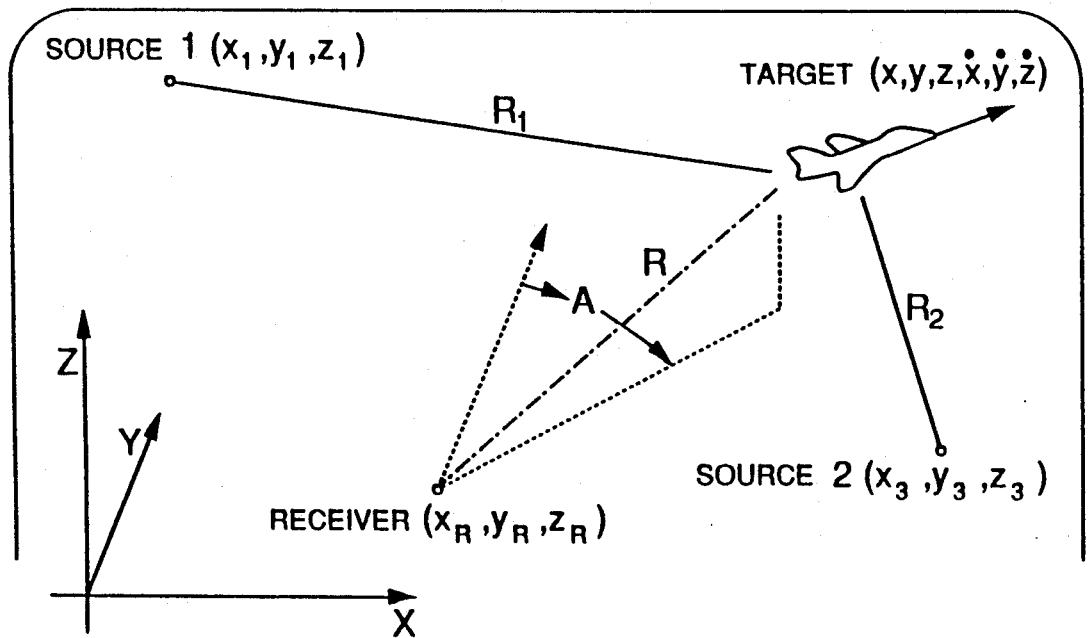
FIG. 2 is an illustration of tristatic geometry terms.

The geometric relationships in this surveillance problem are illustrated in FIG. 2. The two sources, target and receiver are assumed to lie in a three dimensional (x,y,z) space. The target is moving according to the velocity vector (x-dot, y-dot, z-dot). The location problem is to determine the parameters of the target's trajectory from measured values of Doppler and angle. A set of trajectory parameters and their relationship to the instantaneous position and velocity of the target are shown in Table 1.

TABLE 1

TRAJECTORY PARAMETERS

Assume that the target is following a straight line, constant speed trajectory, described by the following parameters:

$$X_O = [x(O), y(O), \dot{x}, \dot{y}]^T$$

Then the position and velocity of the target at any time, t, can be determined from the trajectory parameters:

$$X(t) = \begin{bmatrix} x(t) \\ y(t) \\ z(t) \\ \dot{x}(t) \\ \dot{y}(t) \\ \dot{z}(t) \end{bmatrix} = \begin{bmatrix} x(0) + t\dot{x} \\ y(0) + t\dot{y} \\ z_0 + t\dot{z}_0 \\ \dot{x} \\ \dot{y} \\ \dot{z}_0 \end{bmatrix}$$

The angle of arrival, A, and Doppler shift of the two signals are related to target position and velocity by the relationships illustrated in Table 2.

TABLE 2

MEASUREMENT EQUATIONS

The Doppler frequency shift and angle of arrival of the scattered signal from source i are functions of target position and velocity:

Let:
A = angle of arrival of the scattered signal at the receiver (radians)
$d_i$ = Doppler frequency shift (time rate of change of phase) of the signal from source i (radians per second)
$D_i$ = Doppler shift on signal from source i expressed as the time rang of change of propagation path length (meters/second)

$$d_i = \left( \frac{2\pi F_i}{c} \right) D_i$$

i = Source index (1 or 2)
c = speed of signal propagation through the medium (meters/second)
$F_i$ = frequency of source i (hertz)

$$D_i(t) = \left( \frac{x(t) - x_i}{R_i} + \frac{x(t) - x_R}{R} \right) \dot{x}(t) +$$

-continued $$\left(\frac{y(t)-y_i}{R_i}+\frac{y(t)-y_R}{R}\right)\dot{y}(t)+\left(\frac{z(t)-z_i}{R_i}+\frac{z(t)-z_R}{R}\right)\dot{z}(t)$$

$$A(t)=\tan^{-1}\frac{x(t)-x_R}{y(t)-y_R}$$

Where:

$$R_i=[(x(t)-x_i)^2+(y(t)-y_i)^2+(z(t)-z_i)^2]^{\frac{1}{2}}$$

$$R=[(x(t)-x_R)^2+(y(t)-y_R)^2+(z(t)-z_R)^2]^{\frac{1}{2}}$$

Repeated measurements of the two Doppler shifts and angle of arrival must be made over a time interval whose duration depends on the desired accuracy of the estimates. Parameter estimation requires explicit relationships between the available measurements and those parameters to be estimated and can be indicated as:

$$M(t)=[D_1(t_1), A(t_1), D_2(t_2), A(t_2), D_1,(t_3), a(t_3), \ldots,$$

$$D_j(t_n), A(t_n)]^T$$

where M(t) equals a set of Doppler and angle values observed over a time interval. The sensitivity of a measurement set M(t) to the trajectory parameters $X_O$ is:

$$H=\frac{2M(t)}{2X_0}=\frac{2M(t)}{2X(t)}\times\frac{2X(t)}{2X_0}$$

The algorithm for deriving target trajectory parameter estimates is a nonlinear parameter estimator and is given in Table 4.

Accuracy of resulting estimates depends on such factors as the precision of Doppler and angle measurements available, wave length of signals, number of independent measurements available, time span of measurements, geometric relationships and target speed and maneuvers.

A single sample of each of the three measured quantities (two Dopplers and an angle) is not sufficient to support a solution for target trajectory parameters. Repeated measurements must be made over a time interval. The duration of this interval depends on the desired accuracy of the estimates, which in turn depends on factors discussed below.

Parameter estimation requires explicit relationships between the available measurements and the parameters to be estimated. Formulae for these relationships are provided in Table 3.

TABLE 3

SENSITIVITY RELATIONSHIPS (Parts of 1 of 3)

Let M(t) equal a set of Doppler and angle values observed over a time interval:
M(t) = [D_1(t_1), A(t_1), D_2(t_2), A(t_2), D_1(t_3),
  A(t_3), \ldots, D_j(t_n), A(t_n)]^T
The sensitivity of a measurement set M(t)
to the trajectory parameters $X_0$ is:

$$H=\frac{\partial M(t)}{\partial X_0}=\frac{\partial M(t)}{\partial X(t)}\cdot\frac{\partial X(t)}{\partial X_0}$$

TABLE 3-continued

SENSITIVITY RELATIONSHIPS (Parts of 1 of 3)

$$H=\begin{bmatrix}\frac{\partial D_1(t_1)}{\partial x(0)} & \frac{\partial D_1(t_1)}{\partial y(0)} & \frac{\partial D_1(t_1)}{\partial x} & \frac{\partial D_1(t_1)}{\partial y}\\ \frac{\partial A(t_1)}{\partial x(0)} & \frac{\partial A(t_1)}{\partial y(0)} & \frac{\partial A(t_1)}{\partial x} & \frac{\partial A(t_1)}{\partial y}\\ \frac{\partial D_2(t_2)}{\partial x(0)} & \frac{\partial D_2(t_2)}{\partial y(0)} & \frac{\partial D_2(t_2)}{\partial x} & \frac{\partial D_2(t_2)}{\partial y}\\ \frac{\partial A(t_2)}{\partial x(0)} & \frac{\partial A(t_2)}{\partial y(0)} & \frac{\partial A(t_2)}{\partial x} & \frac{\partial A(t_2)}{\partial y}\\ \frac{\partial D_1(t_3)}{\partial x(0)} & \frac{\partial D_1(t_3)}{\partial y(0)} & \frac{\partial D_1(t_3)}{\partial x} & \frac{\partial D_1(t_3)}{\partial y}\\ \frac{\partial A(t_3)}{\partial x(0)} & \frac{\partial A(t_3)}{\partial y(0)} & \frac{\partial A(t_3)}{\partial x} & \frac{\partial A(t_3)}{\partial y}\\ \cdots \\ \cdots\end{bmatrix}$$

$$\frac{\partial D_1(t)}{\partial x(t)}=\frac{x(t)-x_i}{R_i}+\frac{x(t)-x_R}{R}$$

$$\frac{\partial D_1(t)}{\partial y(t)}=\frac{y(t)-y_i}{R_i}+\frac{y(t)-y_R}{R}$$

$$\frac{\partial A(t)}{\partial x(t)}=\frac{y(t)-y_R}{[(x(t)-x_R)^2+(y(t)-y_R)^2]}$$

$$\frac{\partial A(t)}{\partial y(t)}=-\frac{x(t)-x_R}{[(x(t)-x_R)^2+(y(t)-y_R)^2]}$$

$$\frac{\partial \dot{A}(t)}{\partial x(t)}=0$$

$$\frac{\partial \dot{A}(t)}{\partial y(t)}=0$$

$$\frac{\partial M(t_j)}{\partial X(t_j)}=$$

$$\begin{bmatrix}\frac{\partial D_j(t_j)}{\partial x(t_j)} & \frac{\partial D_j(t_j)}{\partial y(t_j)} & \frac{\partial D_j(t_j)}{\partial z(t_j)} & \frac{\partial D_j(t_j)}{\partial \dot{x}(t_j)} & \frac{\partial D_j(t_j)}{\partial \dot{y}(t_j)} & \frac{\partial D_j(t_j)}{\partial \dot{z}(t_j)}\\ \frac{\partial A(t_j)}{\partial x(t_j)} & \frac{\partial A(t_j)}{\partial y(t_j)} & \frac{\partial A(t_j)}{\partial z(t_j)} & \frac{\partial A(t_j)}{\partial \dot{x}(t_j)} & \frac{\partial A(t_j)}{\partial \dot{y}(t_j)} & \frac{\partial A(t_j)}{\partial \dot{z}(t_j)}\end{bmatrix}$$

$$\frac{\partial X(t_j)}{\partial X_0}=\begin{bmatrix}1 & 0 & t_j & 0\\ 0 & 1 & 0 & t_j\\ 0 & 0 & 0 & 0\\ 0 & 0 & 1 & 0\\ 0 & 0 & 0 & 1\\ 0 & 0 & 0 & 0\end{bmatrix}$$

$$\frac{\partial \dot{D}_j(t)}{\partial x(t)}=\left\{\frac{1}{R_i}\left[1-\left(\frac{x(t)-x_i}{R_i}\right)^2\right]+\right.$$

$$\frac{1}{R}\left[1-\left(\frac{x(t)-x_R}{R}\right)^2\right]\right\}\dot{x}(t)-$$

$$\left\{\frac{1}{R_i}\left(\frac{x(t)-x_i}{R_i}\right)\left(\frac{y(t)-y_i}{R_i}\right)+\right.$$

$$\left.\frac{1}{R}\left(\frac{x(t)-x_R}{R}\right)\left(\frac{y(t)-y_R}{R}\right)\right\}\dot{y}(t)-$$

TABLE 3-continued
SENSITIVITY RELATIONSHIPS (Parts of 1 of 3)

$$\frac{\partial D_f(t)}{\partial y(t)} = -\left\{ \frac{1}{R_i}\left(\frac{x(t)-x_i}{R_i}\right)\left(\frac{z(t)-z_i}{R_i}\right) + \frac{1}{R}\left(\frac{x(t)-x_R}{R}\right)\left(\frac{z(t)-z_R}{R}\right)\right\}z(t)$$

$$-\left\{ \frac{1}{R_i}\left(\frac{x(t)-x_i}{R_i}\right)\left(\frac{y(t)-y_i}{R_i}\right) + \frac{1}{R}\left(\frac{x(t)-x_R}{R}\right)\left(\frac{y(t)-y_R}{R}\right)\right\}x(t) +$$

$$\left\{ \frac{1}{R_i}\left[1 - \left(\frac{y(t)-y_i}{R_i}\right)^2\right] + \frac{1}{R}\left[1 - \left(\frac{y(t)-y_R}{R}\right)^2\right]\right\}y(t) -$$

$$\left\{ \frac{1}{R_i}\left(\frac{z(t)-z_i}{R_i}\right)\left(\frac{y(t)-y_i}{R_i}\right) + \frac{1}{R}\left(\frac{z(t)-z_R}{R}\right)\left(\frac{y(t)-y_R}{R}\right)\right\}z(t)$$

Algorithmic equations for deriving target trajectory parameter estimates are listed in Table 4. The algorithm is a conventional nonlinear minimum variance estimator Unique features include the particular measurement set employed and the technique for selecting the initial parameter set.

Accuracy of the resulting estimates depends on several factors:

1) The accuracy of the Doppler and angle measurements available from the receiving equipment.
2) The wave length of the signals.
3) The number of independent measurements available.
4) The time span over which the measurements are obtained.
5) The geometric relationship between the signal sources, target, and receiver.
6) Target speed and maneuvers.

The relationship between the uncertainty in the measured quantities and the resulting uncertainty in the estimates of the trajectory parameters is included in Table 4. This result assumes that the errors are small enough so that nonlinearities in the measurement equations remain insignificant, that target motion in the z-coordinate is known a priori, and that the target motion does not depart significantly from a straight line, constant speed trajectory, over the observation interval However, a useful location solution may be obtained even when these conditions are not satisfied.

TABLE 4
ALGORITHM FOR LOCATION SOLUTION

1) Select a trial trajectory parameter set:
   $X_0 = [x(0), y(0), x, y]^T$
   (e.g. pick a trial position along radius at angle A from receiver. Then compute x,y from the measured Doppler)

Figure 3:
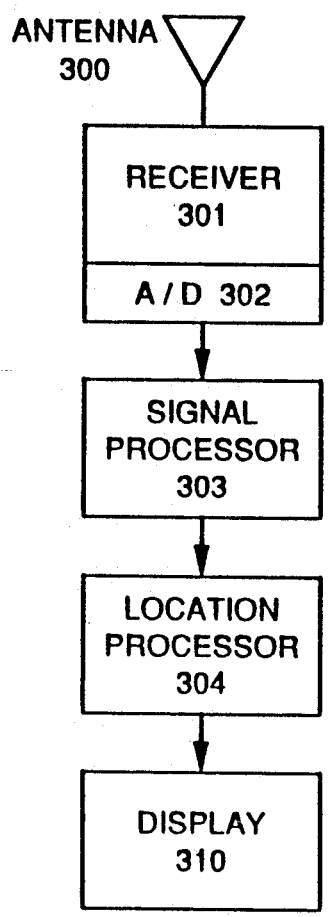
FIG. 3 is a block diagram of the passive radar receiver system used in the invention of FIG. 1.

2) Compute predicted measurements from $X_0$.
   $M = [D_1(t_1), A(t_1), D_2(t_2), A(t_2), D_1(t_3), A(t_3), \ldots, D_f(t_n), A(t_n)]^T$
3) Difference between predicted and actual measurements
   $\Delta M = M - M$
4) Compute H using $X_0$
5) Determine adjustment to $X_0$ which minimized $(\Delta M)^T Q^{-1} \Delta M$
   $\Delta X = (H^T Q^{-1} H)^{-1} H^T Q^{-1} \Delta M$
   {Q is the a priori measurement error covariance matrix}
6) Apply correction
   $X_0 \leftarrow X_0 - \Delta X$
7) Repeat steps 2–7 until $\Delta X$ is small.
8) The final value of $X_0$ constitutes the solution to the location problem.
   LOCATION COVARIANCE
   $\text{Cov}[\Delta X] = (H^T Q^{-1} H)^{-1}$ FIG. 3 is a block diagram of a passive radar receiver system that can implement the present invention and serve as the radar receiver 3 illustrated in FIG. 1. The antenna 300 is a phased array antenna that receives the reference signals 11 and 12, and two target echo return signals 10 and 20 which are illustrated in FIG. 1. The antenna 300 conducts these received signals to the radar receiver 301 which amplifies the faint signals to output a set of four amplified analog radar signals.

The A/D converter 302 converts the amplified analog reference signals and the amplified analog target echo return signals into their digital equivalent for the signal processor 303. The signal processor extracts the target signals from the noise and compares the digital target echo return signals with the digital reference signals to produce an estimate of target signal Doppler shift. In one embodiment of the invention, the signal processor was the commercially-available FPS-55N array processor.

The location processor 304 is a general purpose data Processor which uses the algorithms of the present invention on data received from the signal processor 300 to compute thereby an estimate of the target location and trajectory. Successive radar return signals provide the location processor with a constantly updated estimate of the targets position, which when compared with previous position estimates, provide a basis for computing the target's velocity. This process gives the location processor two methods of determining a targets trajectory: by the use of the algorithm on Doppler shift information; and by the rate of change in distance per unit of time elapsed in successive radar position readings. Note that all of the radar elements in FIG. 3 are equivalent to commercial systems produced for use by the U.S. Air Force by the IBM company, and need not be described in detail. The unique aspect of the present invention entails the use of these elements in a tristatic radar configuration which elicits a target's trajectory by Doppler shift information.

The present invention may also be described as a multistatic radar tracking process composed of five steps. The process begins with a first measuring step in which radar tracking signals are directly measured by a radar receiver system in the form of first and second reference signals which are respectively emitted by first and second remote signal transmitters.

The second measuring step occurs as the radar receiver system measures first and second target echo return signals as the radar tracking signals are reflected off a remote target.

The third step is a signal processing step in which: the angle-of-arrival of the two target echo return signals is determined; and the Doppler frequency shift respectively between the two reference signals and the two target echo return signals is determined In a monostatic radar system, the Doppler shift in frequency directly represents the velocity of the target with respect to the radar receiver. In a tristatic system, the Doppler shift represents the target's velocity with respect to the transmitter, not the receiver.

The fourth step of the process entails using the mathematical relationships described above to determine the target's trajectory and position using the angle-of-arrival and Doppler shift information obtained in the signal processing step.

The fifth step of the process entails repeating the previous four steps in itterations to obtain successive estimates of the target's position and trajectory. By comparing successive predicted positions and velocities with successive measured values for position and velocity, the process conveys as final values correspond with the actual measurements.

In order to understand the advantages of a tristatic radar system, it is necessary to understand the nature of bistatic and monostatic systems. In a monostatic radar system, the radar transmitter and receiver have the same physical location. The simple form of the radar equation for monostatic radar is given by the familiar expression:

$$P_r = \frac{P_t G^2 \lambda^2 \sigma_m}{(4\pi)^3 R^4 L_p^2 L_s} \text{ monostatic}$$

where
$P_r$ = received signal power, watts
$P_t$ = transmitted power, watts
$G$ = antenna gain
$\lambda$ = wavelength, m
$\sigma_m$ = monostatic cross section (backscatter), m$^2$
$R$ = range to target, m
$L_v$ = one-way propagation losses
$L_s$ = system losses.

The corresponding equation for the bistatic radar is:

$$P_r = \frac{P_t G_t G_r \lambda^2 \sigma_b}{(4\pi)^3 D_t^2 D_r^2 L_p(t) L_p(r) L_3} \text{ bistatic}$$

where
$G_t$ = transmitting antenna gain in direction of target
$G_r$ = receiving antenna gain in direction of target
$\sigma_b$ = bistatic cross section, m$^2$
$D_t$ = transmitter-to-target distance, m
$D_r$ = receiver-to-target distance, m In a bistatic radar system, the Doppler shift in frequency represents the velocity of the target with respect to the remotely located transmitter, and not the velocity with respect to the receiver. Similarly, in a tristatic radar system, the Doppler shift in the two target echo return signals represents the velocity of the target respectively with the two remotely located transmitters.

Figure 4:
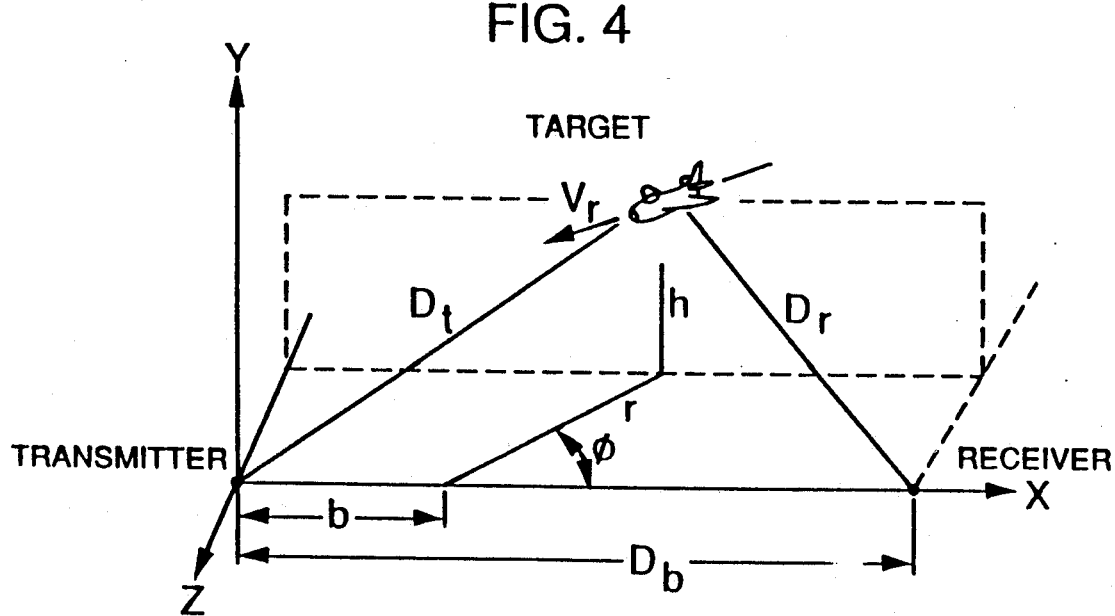
FIG. 4 is an illustration of bistatic tracking terms.

The reader's attention is now directed at FIG. 4, which is an illustration of the geometry of a bistatic radar system which uses the principles explained in the above-cited Skolnik reference. The purpose of FIG. 4 is to explain some of the inherent limitation of a bistatic radar which are overcome by the use of a tristatic radar system. FIG. 4 depicts a target aircraft which is located a distance $D_t$ with respect to the transmitter, and a distance $D_r$ with respect to the receiver, and which is travelling with a velocity $V_r$.

Locating a target with bistatic radar is like locating a target with monostatic radar. The latter measures the total path length from radar to target receiver just as does the bistatic radar. Since the two parts of the path are equal, the distance to the target is one-half the total path length. The distance or range measurement in the monostatic radar locates the target on the surface of a sphere. (The sphere is the limiting case of the prolate spheroid when the separation between the two foci becomes zero.) Hence the target position is found with monostatic radar as the intersection of a ray (defined by the angle of arrival) and the surface of a sphere.

The Doppler beat frequency fd between the scattered and direct signals in the bistatic radar is proportional to the time rate of change f the total path length of the scattered signal, $$f_d = \frac{1}{\lambda} \left[ \frac{d}{dt} (D_t + D_r) \right]$$

where $\lambda$ is the wavelength of the transmitted signal. The Doppler frequency shift provides a means for discriminating stationary objects from moving targets, but it is not a measure of the radial velocity as with the monostatic radar.

In principle, it is possible to determine the trajectory of the target from Doppler measurements only. With the coordinate system and the nomenclature shown in FIG. 4, the Doppler frequency may be written as:

$$f_d = \frac{v_r}{\lambda} \left( \frac{r + b\cos\phi}{(b^2 + r^2 + h^2 + 2br\cos\phi)^{\frac{1}{2}}} + \frac{r - (D_b - b)\cos\phi}{[(D_b - b)^2 + r^2 + h^2 - 2(D_b - b)r\cos\phi]^{\frac{1}{2}}} \right)$$

The above expression may be used as a basis for obtaining the target velocity $V_r$, altitude h, and the crossing angle $\phi$ (provided they remain constant over the time of measurement), as well as the location of the target along the vector r. A minimum of five Doppler-frequency measurements and their times of occurrence is required.

The measurements which can be made at the bistatic receiver are:
1. The total path length ($D_t + D_r$) or transit time, of the scattered signal.
2. The angle of arrival of the scattered signal.
3. The frequency of the direct and the scattered signals. These will be different if the target is in motion (Doppler effect).

A knowledge of the transmitted signal is necessary at the receiver site if the maximum information is to be extracted from the scattered signal. The transmitted frequency is needed to determine the Doppler frequency shift. A time or phase reference is also required if the total scattered path length ($D_t + D_r$) is to be measured. The frequency reference can be obtained from the direct signal. The time reference also can be obtained from the direct signal provided the distance $D_b$ between transmitter and receiver is known.

The distance measured by the bistatic radar is the sum $S = D_t + D_r$, the total scattered path. The sum $D_t + D_r$ locates the target somewhere on the surface of a prolate spheroid whose two foci are at the location of the transmitter and receiver To further localize the target position the scattered-signal angle of arrival is required at of the prolate spheroid determines the position of the target in space.

Applying the law of cosines to the geometry of FIG. 4 gives:

$$D_t^2 = D_r^2 + D_b^2 - 2D_r D_b \cos \psi_6$$

where is the angle of arrival measured in the plane of the fence, here assumed to be vertical. The bistatic radar can measure and $S = D_t + D_r$. The separation D between transmitter and receiver is assumed known. The preceding equation may be written:

$$D_t = \frac{S^2 + D_b^2 - 2SD_b\cos\psi_e}{2(S - D_b\cos\psi_e)}$$

$$D_r = \frac{S^2 - D_b^2}{2(S - D_b\cos\psi_e)}$$

Since the angle-of-arrival yields the azimuth and elevation of the target, the value of $D_r$ will locate an estimate of the target's position in three dimensional coordinates with respect to the receiver.

One of the inherent limitations of a bistatic radar system is that the Doppler shift represents the target's velocity with respect to the transmitter and not the receiver. If the target has a circular trajectory with the transmitter at the center, then the receiver will detect zero Doppler shift with respect to the target echo return signals, a response that suggests zero velocity even though the target may be travelling at a high velocity.

The use of two transmitters solves the inherent limitation described above. While a target may manifest zero Doppler shift with regards to a single transmitter, a second remotely placed transmitter will yield another Doppler shift source of information to resolve this ambiguity.

A second source of ambiguity can occur when narrow band transmissions are used. This creates ambiguity since the target echo return signals may be correlated with a number of different transmissions of the reference signal. This ambiguity makes it difficult to determine the target's range with respect to the radar receiver.

The present invention resolves this ambiguity through the inherent advantages of a tristatic system, where two transmitters are used, and where two Doppler shift readings provide a basis for the determination of a target's position and trajectory.

The present invention has been described as using a tristatic radar system using multiple remotely located transmitting sources on a single passive receiver.

A multistatic system enjoys a natural diversity advantage. Multiple illuminators at geographically distinct locations tend to make propagation effects such as multipath loss independent on each transmitter to target different frequencies, giving a diversity of target cross sections. These factors tend to make target signal fading independent from illuminator to illuminator, thereby enhancing the probably that the target is detected on some minimum number of illumination channels To accrue this advantage, more than the minimal number of illuminators must be exploited.

While the invention has been described in its presently preferred embodiment it is understood that the words which have been used are words of description rather than words of limitation and that changes within the Purview of the appended claims may be made without departing from the scope and spirit of the invention in its broader aspects.

What is claimed is:

1. A tristatic target location system for tracking a target, said tristatic target location system comprising:
   a first transmitter which emits a first radar tracking signal;
   a second transmitter which is physically separated from said first transmitter, and which emits a second radar tracking signal; and
   a means for passively receiving signals, said passive receiving means receiving said first and second radar tracking signals directly from said first and second transmitters and respectively using them as first and second reference signals, said passive receiving means receiving first and second target echo return signals at a determined angle of arrival from said target when the target reflects the first and second radar tracking signals, said passive receiving means determining said target's azimuth and elevation from said angle of arrival, and said target's range and velocity by comparing said first and second target echo return signals respectively with first and second reference signals.

2. A tristatic target location system, as defined in claim 1, wherein said passive receiving means comprises:
   an antenna which is remotely located from said first and second transmitters, and which receives and conducts said first and second reference signals therefrom, said antenna receiving and conducting said first and second target echo return signals received from said target;
   a means for processing data which receives said first and second reference signals and said first and second target echo return signals from said antenna and calculates said target's position and velocity therefrom; and
   a means for displaying said target's position and velocity, said displaying means being electrically connected with said data processing means.

3. A tristatic target location system, as defined in claim 1, wherein said data processing means comprises:
   a signal processor which receives said first and second reference signals and said first and second target echo return signals from said antenna, said signal processor producing output signals by computing a first and second Doppler shift by comparing said first and second target echo return signals respectively with said first and second reference signals, said signal processor determining the target's azimuth and elevation by the angle of arrival of the first and second target echo return signals, said signal processor computing said target's range by comparing a delay between reception of the first and second target echo return signals respectively with the first and second reference signals; and
   a location processor which receives the output signals of the signal processor and which computes the target's position and velocity therefrom for the displaying means.

4. A multistatic target location system for tracking a target, said multistatic target location system comprising:
- a plurality of radar transmitters which are remotely located from each other, and which emit radar tracking signals that include a first and a second radar tracking signal;
- a means for passively receiving signals, said passive receiving means receiving said first and second radar tracking signals directly from said plurality of radar transmitters and using them as first and second reference signals, said passive receiving means receiving first and second target echo return signals at a determined angle of arrival from said target when the target reflects the first and second radar tracking signals, said passive receiving means determining the target's azimuth and elevation from said angle of arrival, and said target's range and velocity by comparing said first and second target echo return signals respectively with said first and second reference signals.

5. A multistatic target location system, as defined in claim 4, wherein said passive receiving means comprises:
- an antenna which is remotely located from said plurality of radar transmitters, and which receives and conducts said first and second reference signals therefrom, said antenna receiving and conducting said first and second target echo return signals received from said target;
- a means for processing data which receives said first and second reference signals and said first and second target echo return signals from said antenna an calculating said target's position and velocity therefrom; and
- a means for displaying said target's position and velocity said displaying means being electrically connected with said data processing means.

6. A multistatic target location system, as defined in claim 5, wherein said data processing means comprises:
- a signal processor which receives said first and second reference signals and said first and second target echo return signals from said antenna, said signal processor producing output signals by computing a first and second Doppler shift by comparing said first and second target echo return signals respectively with said first and second the target's azimuth and elevation by the angle of arrival of the first and second target echo return signals, said signal processor computing said target's range by comparing a delay between reception of the first and second target echo return signals respectively with the first and second reference signals; and
- a locating processor which receives the output signals of the signal processor and which computes the target's position and velocity therefrom for the displaying means.

7. A target locating process for identifying a target's position and velocity, said target locating process comprising the steps of:
- emitting a plurality of radar tracking signals including at least first and second radar tracking signals which are emitted respectively from first and second radar transmitters which are remote from each other;
- producing measurements that include first and second target echo return signals and said first and second radar tracking signals, said producing step including a measurement of angle of arrival of the target echo return signals, and a measurement of frequency of the first and second radar signals and the first and second target echo return signals; and
- determining the target's position and velocity from the measurements obtained in the producing step.

8. A target locating process, as defined in claim 7, wherein said determining step includes determining the target's velocity by a first and second Doppler shift respectively between the first and second radar tracking signals and the first and second target echo return signals.

9. A target locating process, as defined in claim 8, wherein said emitting and producing steps re repetitively performed, and wherein said determining step includes the substeps of:
- determining the target's azimuth and elevation by the angle of arrival of the first and second target echo return signals;
- estimating the target's range using a difference in time in reception between the first and second radar tracking signals and the first and second target echo return signals;
- identifying the target s position by its azimuth, elevation and range;
- repeating the determining, estimating and identifying substeps to obtain a sequence of target positions;
- determining a first estimate of the target's velocity by the sequence of target positions; and
- checking the target's velocity by comparing the first estimate of the target's velocity with a second estimate of the target's velocity, said second estimate of the target's velocity being based on the first and second Doppler shift.

* * * * *